United States Patent
Shamir

(10) Patent No.: US 9,615,538 B2
(45) Date of Patent: Apr. 11, 2017

(54) ANIMAL LITTER BOX

(71) Applicant: Erez Shamir, Herzeliya (IL)

(72) Inventor: Erez Shamir, Herzeliya (IL)

(73) Assignee: SHAMIR GLOBAL LTD., Kochav Yair (IL)

( * ) Notice: Subject to any disclaimer, the term of this patent is extended or adjusted under 35 U.S.C. 154(b) by 69 days.

(21) Appl. No.: 14/397,185

(22) PCT Filed: Apr. 24, 2013

(86) PCT No.: PCT/IL2013/050357
§ 371 (c)(1),
(2) Date: Oct. 25, 2014

(87) PCT Pub. No.: WO2013/160899
PCT Pub. Date: Oct. 31, 2013

(65) Prior Publication Data
US 2015/0114303 A1 Apr. 30, 2015

Related U.S. Application Data

(60) Provisional application No. 61/638,592, filed on Apr. 26, 2012.

(51) Int. Cl.
*A01K 29/00* (2006.01)
*A01K 1/01* (2006.01)

(52) U.S. Cl.
CPC ............ *A01K 1/011* (2013.01); *A01K 1/0107* (2013.01); *A01K 1/0114* (2013.01)

(58) Field of Classification Search
CPC ......... A01K 1/01; A01K 1/011; A01K 1/0114
(Continued)

(56) References Cited

U.S. PATENT DOCUMENTS 5,220,886 A * 6/1993 Hyde .................. A01K 1/0114
119/165
5,507,252 A 4/1996 Ebert
(Continued)

FOREIGN PATENT DOCUMENTS

EP 2113168 A2 * 11/2009 ........... A01K 1/0107

OTHER PUBLICATIONS

International Search Report for International Application No. PCT/IL2012/000248 dated Sep. 13, 2012.

*Primary Examiner* — Timothy D Collins
*Assistant Examiner* — James Atwell
(74) *Attorney, Agent, or Firm* — Polsinelli PC

(57) ABSTRACT

An animal litter-box including granular-material-housing, having a window opening formed in the front side of the granular-material-housing, allowing an animal to walk in and out of the granular-material-housing. The window opening includes an upper edge, a lower edge and two side edges. The animal litter-box further includes a granular-sifting-apparatus, having a container body, and a litter-scooper disposed inside the upper portion of the container body. The litter-scooper includes a scooper container body, wherein sifting-openings are formed at the bottom and optionally, at the lower sides of the scooper body. The granular-sifting-apparatus further includes a paws-sifter, disposed on top of the litter-scooper, for the animal to step on when going in and out of the granular-material-housing.

15 Claims, 17 Drawing Sheets

(58) Field of Classification Search
USPC .................................................. 119/165, 166
See application file for complete search history.

(56) References Cited

U.S. PATENT DOCUMENTS

| | | | |
|---|---|---|---|
| 5,598,810 A | | 2/1997 | Lawton, III |
| 5,785,000 A | * | 7/1998 | Barbary ............... A01K 1/0114 |
| | | | 119/166 |
| 6,295,949 B1 | | 10/2001 | Willis |
| 6,742,476 B2 | | 6/2004 | Sage, Jr. |
| 2002/0144935 A1 | * | 10/2002 | Tims ........................ B07B 1/02 |
| | | | 209/235 |
| 2009/0199778 A1 | | 8/2009 | Kratzer et al. |

* cited by examiner

CROSS-SECTION AA'

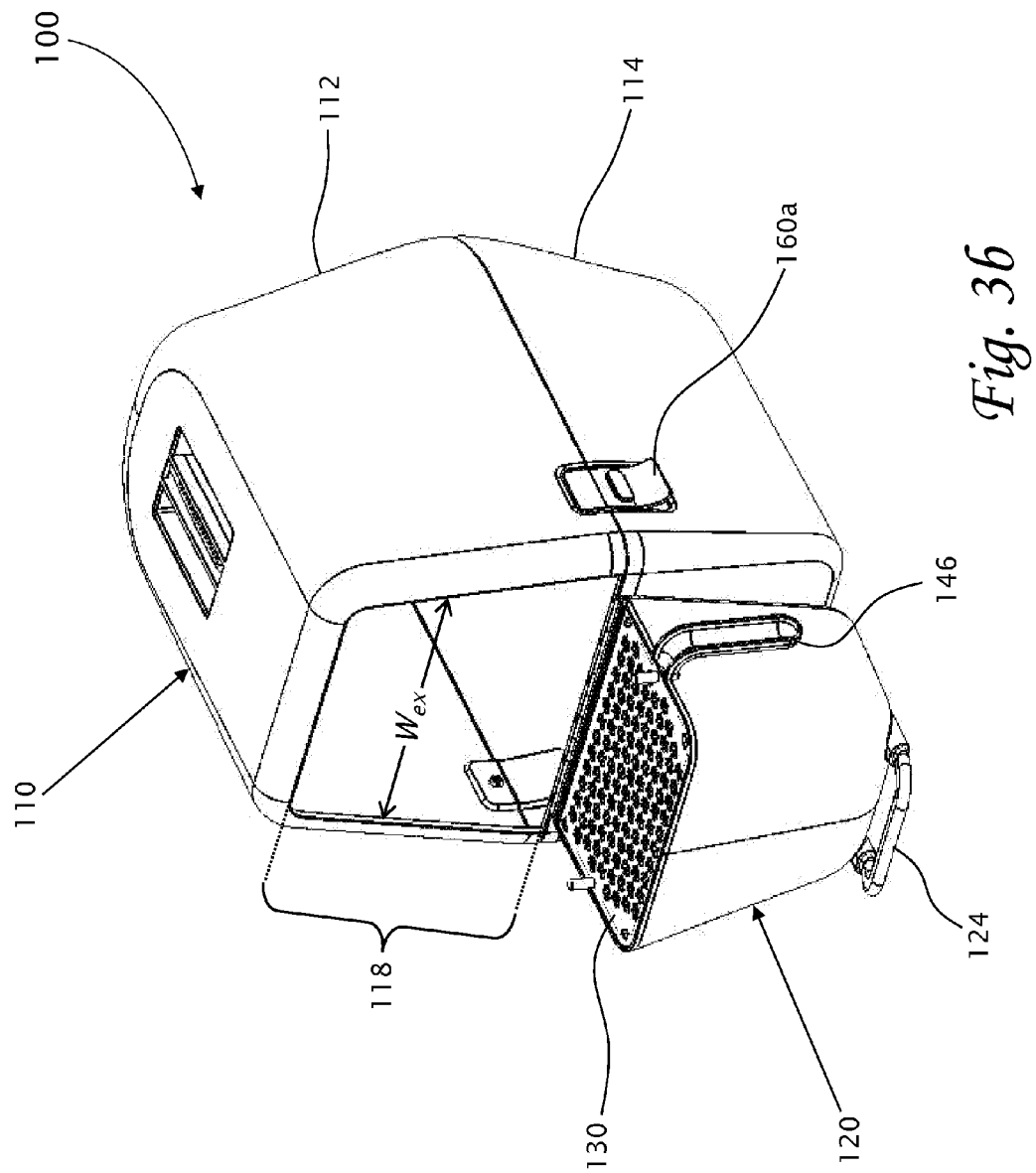

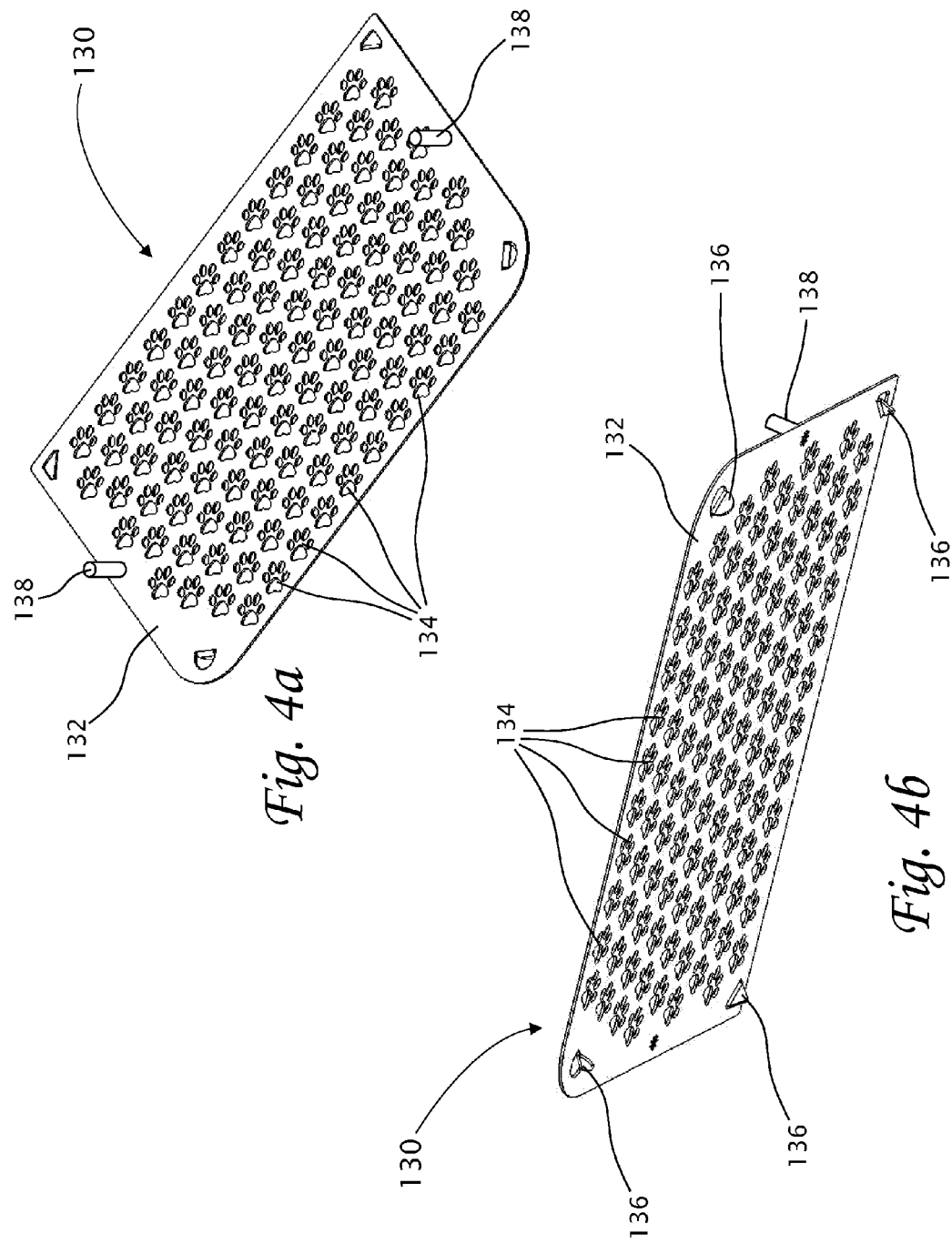

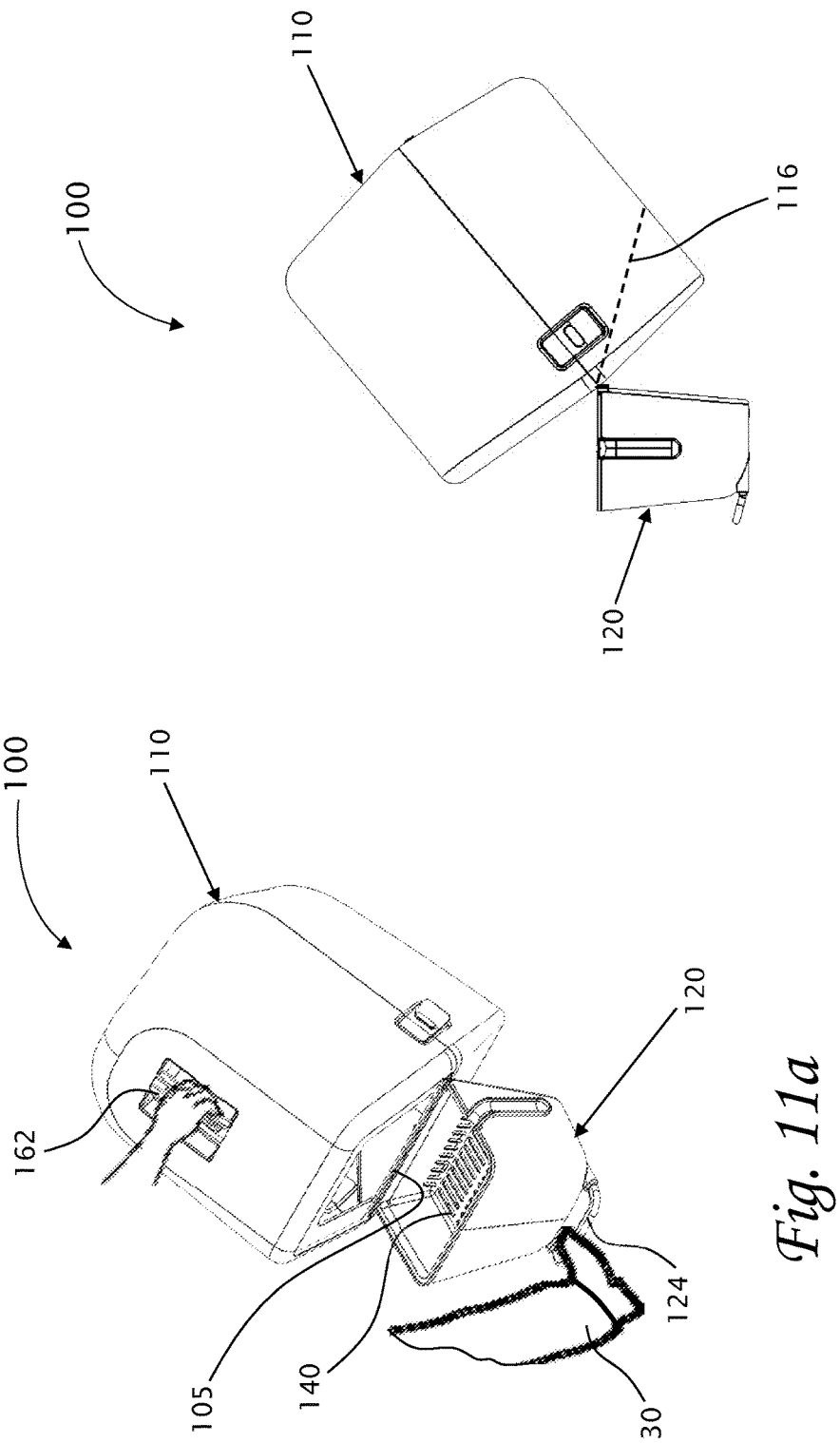

ANIMAL LITTER BOX

CROSS REFERENCE TO RELATED APPLICATIONS

This application claims is a national stage application of PCT application PCT/IL2013/050357, filed Apr. 24, 2013, the disclosure of which is incorporated by reference for all purposes as if fully set forth herein.

FIELD OF THE INVENTION

The present invention relates to animal litter boxes. More particularly, the present invention is related to a litter box for cats that does not require manual scooping of the cat litter and that reduces litter spillage and tracking by means of removing and recycling litter stuck to cat's paws or thrown out while digging.

BACKGROUND OF THE INVENTION

In recent years, cats have become the most popular house pet in many countries around the world. This is partly due to the fact that raising a cat indoors is in many ways easier than raising a dog, since a dog needs to be taken out several times a day for toilet use, whereas a cat can stay indoors permanently, using a litter box as a toilet. Hence, cat litter boxes have become a common feature in many residences around the world.

Broadly speaking, the cat litter box solutions offered today can be divided into three types. The first type includes simple, non-automatic litter boxes that require the use of a manual scooper to remove the cat waste. More advanced non-automatic litter boxes enable cleaning the cat litter without a need for direct manual scooping. The third type of cat litter boxes are automatic litter boxes that claim to clean the cat litter without any human interaction. While both non-automatic market segments offer litter boxes solutions that are more or less in the same price range, the automatic litter boxes solutions tend to be much more expensive and often require repeat purchasing of specific consumable materials, and thus may be viewed as a completely different market segment. The present invention relates to the two non-automatic market segments.

Typically, simple, non-automatic litter boxes come in two forms—open boxes and closed boxes. Both forms of boxes most often make use of replaceable litter material, granular material that reacts to the cat's feces and urine to form an aggregated lump, thus allowing the cat to dig in and deposit solid and liquid waste. In both cases, cleaning the cat litter is achieved using a scooping device which is manually driven throughout the base of the box in search for waste to extract. The main difference between these two forms of litter boxes is that while the open form allows smells and litter particles to freely escape to the surrounding environment, the closed one reduces such effects.

Simple, non-automatic litter boxes are popular due to the fact that they are cheap to purchase and simple to operate. However, these litter boxes suffer from some major disadvantages. The main disadvantage of prior art, non-automatic litter boxes, is that they need to be thoroughly scooped, manually, in search for waste, a time consuming, messy and smelly process. Moreover, in the blind search for waste in the granular material, the scooping device often causes clumped litter aggregates to break down and fall apart, which both makes it harder to scoop them out, and releases even more foul odors into the immediate environment.

Another major disadvantage of prior art, non-automatic litter boxes, is that they offer no solution to the problem of litter sticking to the cat's paws. Typically, a cat leaving the litter box has litter particles stuck to its paws, and unless the litter particles are removed as the cat exits the litter box, these particles tend to scatter throughout the surrounding environment ("tracking"), causing major inconvenience to the cat owner. In fact, the above disadvantages are the main reason many consumers search for other solutions to the task of cleaning the cat's waste.

In order to overcome the aforementioned disadvantages, more advanced non-automatic litter boxes were developed to facilitate the cleaning of waste without the need for manual scooping, thus minimizing direct interaction of the cat owner with the cat's waste, as well as reducing the breakage of waste aggregates during the cleaning process, for example, U.S. Pat. Nos. 6,742,476, 5,507,252 and 5,598,810. Similarly, other litter boxes were introduced into the market with the aim of tackling the problem of litter spillage and tracking (design patent D463887). However, each one of these products has its own unique disadvantages (some require vast physical space to operate, some collect the litter waste into a large tray that is difficult to empty into a small form plastic bag), and none of these products combine these two important features (no need for manual scooping, cleaning cat's paws) into one working solution.

In view of the foregoing, there is a need for and it would be advantageous to have a non-automatic litter box that does not require manual scooping of the cat litter, facilitates cleaning the cat's paws from left over granular material, and allows the removed granular material to be recycled and reused.

SUMMARY OF THE INVENTION

The principal intentions of the present invention include providing a cat litter-box that does not require manual scooping of the cat litter and that minimizes the spread of granular material in the area surrounding the litter box.

According to the teachings of the present invention, there is provided an animal litter-box including a granular-material-housing, having a window opening formed in the front side of the granular-material-housing, allowing an animal to walk in and out of the granular-material-housing. The window opening includes an upper edge, a lower edge and two side edges. The animal litter-box further includes a granular-sifting-apparatus, having a container body, and a litter-scooper disposed inside the upper portion of the container body. The litter-scooper includes a scooper container body, wherein sifting-openings are formed at the bottom and optionally, at the lower sides of the scooper body. The granular-sifting-apparatus further includes a paws-sifter, disposed on top of the litter-scooper, for the animal to step on when going in and out of the granular-material-housing. The granular-material-housing contains granular material up to a preconfigured level and possibly waste aggregates, and wherein the granular-sifting-apparatus is pivotally connected to the front side of the granular-material-housing, typically, at the lower edge of the window opening.

Preferably, the width of the window opening is larger than the width of the granular-sifting-apparatus.

Optionally, the animal litter-box further includes a limiting-door, wherein the limiting-door narrows the width of the window opening to be less than or equal to the width of the granular-sifting-apparatus.

In one embodiment, the limiting-door is pivotally connected to the top edge of the window opening or at the top section of the side edges of the window opening.

In another embodiment, the limiting-door includes two flap doors pivotally connected respectively to the side edges of the window opening, forming a narrower window opening, at a closed state.

In yet another embodiment, the limiting-door includes two elastic doors securely connected respectively to the side edges of the window opening, forming a narrower window opening, at a closed state.

Optionally, the granular-material-housing includes a bottom part and a top part, the bottom part being a litter-container and the top part being a cover. Optionally, the litter-container includes a sloped-inner-wall extending from, or proximal to, the pivoting axis, to a preconfigured location at the inner floor of the litter-container. Optionally, the sloped-inner-wall is an external wall of the litter-container.

Optionally, the cover includes a carrying handle.

Preferably, the animal litter-box further includes a foothold for holding the granular-sifting-apparatus in position. The foothold may be securely attached to the bottom of the granular-sifting-apparatus.

Optionally, the granular-sifting-apparatus is pivotally connected about a pivoting axis to the front side of the granular-material-housing at the lower edge of the window opening, and wherein the foothold is securely attached to the shaft of the pivoting axis. Optionally, an external recess is formed at, or proximal to, the bottom of the container body, facilitating pivotal lifting of the container body towards the granular-material-housing.

Preferably, the dimensions of the sifting-openings are larger than those of the granular material and smaller than those of typical waste aggregates.

Preferably, when the animal litter-box does not include limiting-doors, the width of the window opening is slightly larger than the width of the granular-sifting-apparatus, preconfigured to allow fittingly smooth passage of the granular-sifting-apparatus into the granular-material-housing, while minimizing granular material spillage when pouring the granular material from the granular-material-housing into the container body.

Preferably, the paws-sifter includes a plate having a plurality of through-openings formed therein, wherein the dimensions of the through-openings are larger than those of the granular material and smaller than those of typical animal paw size.

Optionally, the animal litter-box further includes a scraper.

Optionally, when the animal litter-box includes side limiting-doors, the window opening is enclosed by an enclosing-door that is pivotally attached to the top edge of the window opening or at the top section of the side edges of the window opening.

An aspect of the present invention is to provide a method for removing animal waste from an animal litter-box, having a foothold for holding said granular-sifting-apparatus in position, the method including the following steps:
  a) removing the paws-sifter,
  b) pressing down on the foothold to thereby keep the granular-sifting-apparatus in position,
  c) grabbing the carrying handle,
  d) pivoting the granular-material-housing about the pivoting axis towards the granular-sifting-apparatus until the front side of the granular-material-housing is positioned adjacently or proximal to the top edge of the container body,
  e) waiting until at least a portion of the granular material has poured out of the granular-material-housing, including all waste aggregates,
  f) pivoting back the granular-material-housing until disposed in a stationary position;
  g) allowing substantially all of the granular material to sift through the sifting-openings of the litter-scooper and into the container body,
  h) removing the scooper body from the container body and disposing of the waste aggregates collected inside the scooper body.

When the animal litter-box includes an enclosing-door, the method for removing animal litter from an animal litter-box further includes the step of pulling the enclosing-door before pivoting the granular-material-housing about the pivoting axis towards the granular-sifting-apparatus.

An aspect of the present invention is to provide a method for recycling animal litter into an animal litter-box, having a foothold for holding said granular-sifting-apparatus in position, the method including the following steps:
  a) pivotally lifting the container body, using the foothold or an external recess formed at, or proximal to, the bottom of the container body, until the container body reaches or passes through the window opening, pushing the limiting-door inwardly,
  b) waiting until substantially all of the granular material, accumulated inside the container body, pours into the granular-sifting-apparatus,
  c) pivoting back the granular-sifting-apparatus until disposed in a stationary position;
  d) placing the litter-scooper inside the upper portion of the container body,
  e) placing the paws-sifter on top of the litter-scooper.

BRIEF DESCRIPTION OF THE DRAWINGS

The present invention will become fully understood from the detailed description given herein below and the accompanying drawings, which drawings are generally not drawn to scale and are given by way of illustration only and thus, not limitative of the present invention, and wherein:

FIG. 3b is a perspective view illustration of the animal litter-box shown in FIG. 1, wherein the optional pivoting-door has been removed, for illustrative purposes only.

FIG. 4a is a top perspective view illustration of a paws-sifter of the animal litter-box shown in FIG. 1.

FIG. 4b is a bottom perspective view illustration of the paws-sifter shown in FIG. 3a.

FIG. 8c is a bottom perspective view illustration of an animal litter-box shown in FIG. 8a.

FIG. 11a is a perspective view illustration of the animal litter-box shown in FIG. 2, wherein the granular-material-housing is partially pivoted towards the granular-sifting-apparatus.

FIG. 11b is a side view illustration of the animal litter-box, as shown in FIG. 11a.

DETAILED DESCRIPTION OF THE INVENTION

The present invention will now be described more fully hereinafter with reference to the accompanying drawings, in which drawings show preferred embodiments of the invention. Present invention may, however, be embodied in many different forms and should not be construed as limited to the embodiments set forth herein; rather, these embodiments are provided, so that this disclosure will be thorough and complete, and will fully convey the scope of the invention to those skilled in the art.

Unless otherwise defined, all technical and scientific terms used herein have the same meaning as commonly understood by one of ordinary skill in the art to which the present invention belongs. The methods and examples provided herein are illustrative only and not intended to be limiting.

By way of introduction, the principal intentions of the present invention include providing a cat litter-box that does not require manual scooping of the cat litter and that minimizes the spread of granular material in the area surrounding the litter box.

Figure 1:
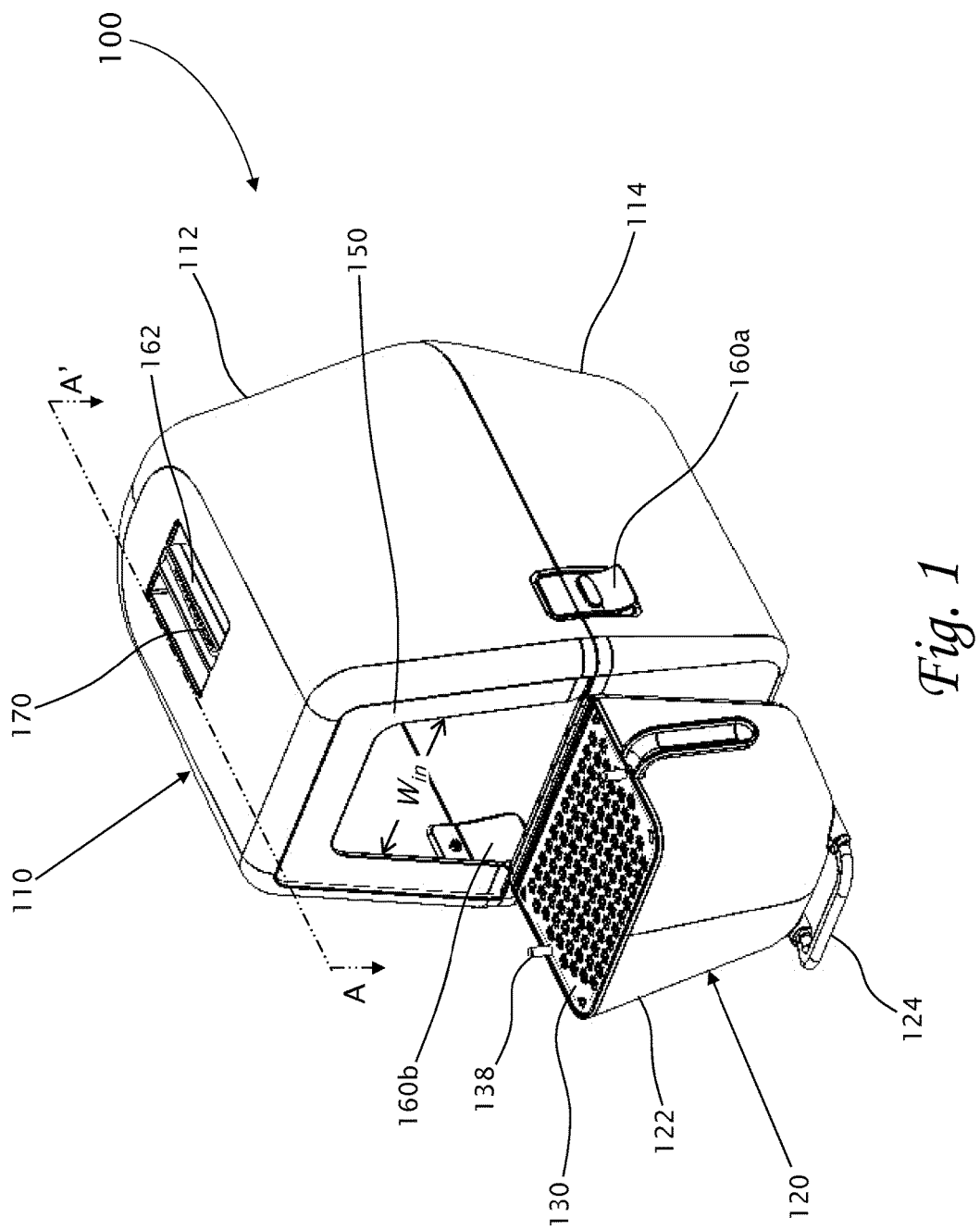
FIG. 1 is a perspective view of an animal litter-box, according to embodiments of the present invention, the litter-box having a non-messy cleaning mechanism
Figure 2:
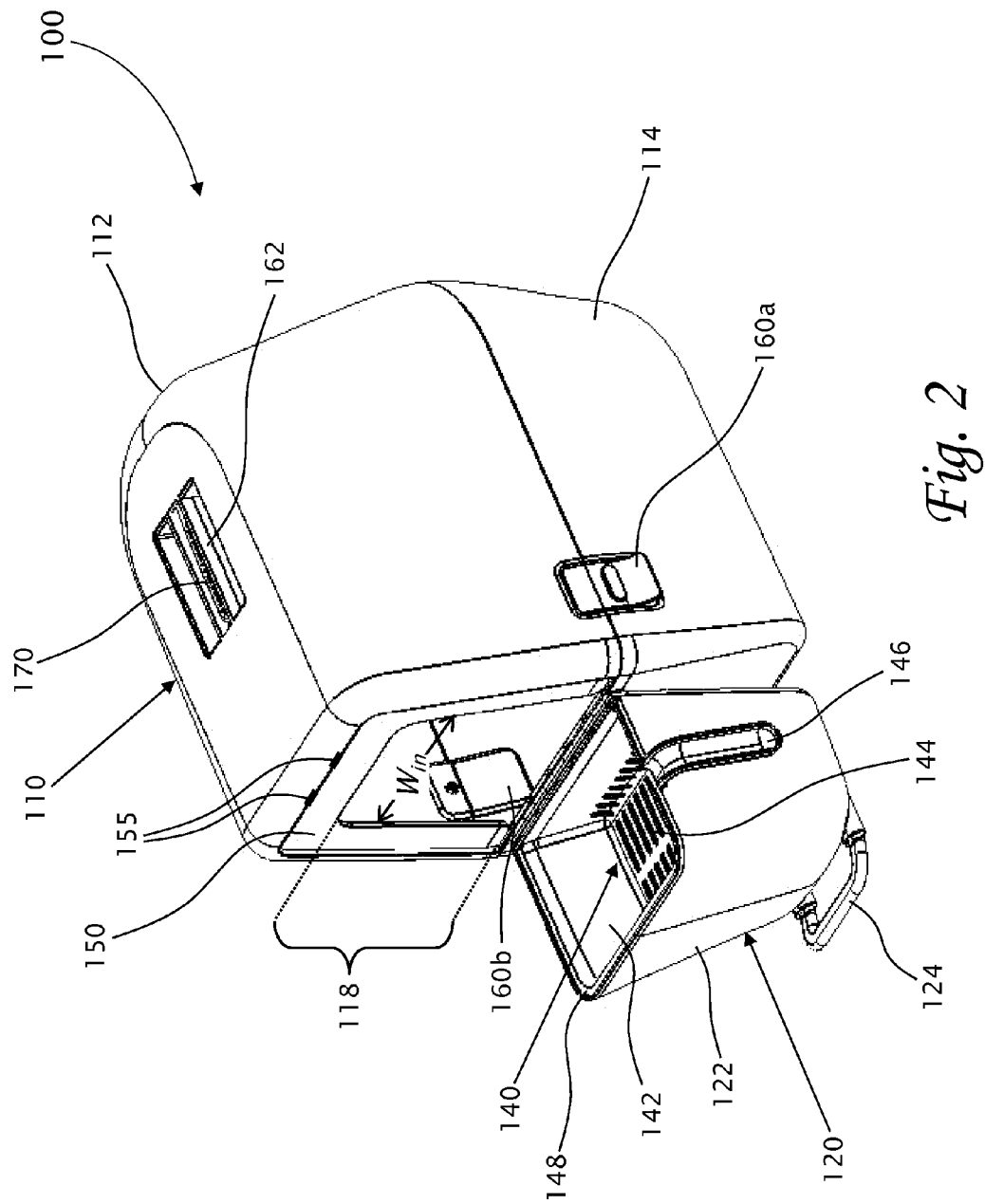
FIG. 2 is a perspective view illustration of the animal litter-box shown in FIG. 1, wherein the paws sifter is removed.

Reference is made to the drawings. FIG. 1 is a perspective view of an animal litter-box 100, according to embodiments of the present invention, litter-box 100 having a non-messy cleaning mechanism. Reference is also made to FIG. 2, a perspective view illustration of animal litter-box 100, wherein paws-sifter 130 has been removed. Animal litter-box 100 includes a granular-material-housing 110, a granular-sifting-apparatus 120, a paws-sifter 130, a litter-scooper 140, preferably a pivoting-door 150 and an optional scraper 170.

Figure 3A:
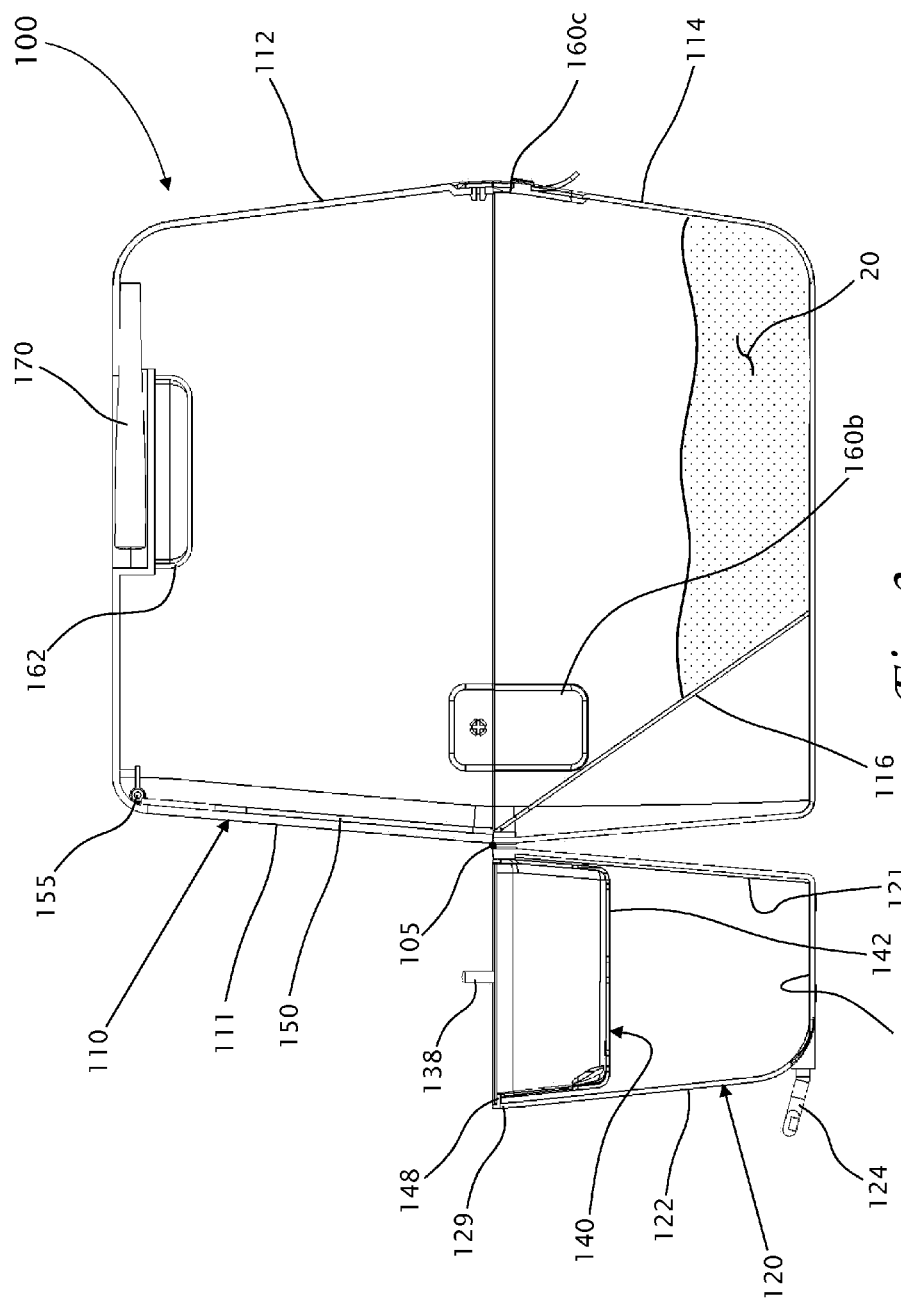
FIG. 3a is a side, cross-section (AA') view illustration of an animal litter-box, as shown in FIG. 1.

Reference is also made to FIG. 3a, a side, cross-section (AA') view illustration of animal litter-box 100, and to FIG. 3b, a perspective view illustration of animal litter-box apparatus 100, wherein the optional pivoting-door 150 has been removed, for illustrative purposes only. Pivoting-door 150 is a limiting door, having, for example, an up-side-down "U" shape. Preferably, the width of granular-sifting-apparatus 120 is smaller than the width $W_{ex}$ (see FIG. 3b) of a window opening 118 formed at the front side 111 (see FIG. 3a) of granular-material-housing 110, wherein the external width of granular-sifting-apparatus 120 is larger than or equal to the width $W_{in}$ of the opening formed inside pivoting-door 150 (see FIGS. 1 and 2) that preferably, may pivot about hinges 155, inwardly only. FIGS. 2 and 3a further illustrate a litter-scooper 140 disposed on top of an open top rim 129 of granular-sifting-apparatus 120. The open top rim may also be partially lowered to thereby form a bench, on top of which bench litter-scooper 140 is disposed (not shown).

Granular-material-housing 110 includes a bottom part 114 and a top part 112 ("top" and "bottom", as used herein, with respect to the operational orientation of animal litter-box 100, when available for serving animals), bottom part 114 being a litter-container, and top part 112 being a cover. Bottom part 114 and top part 112 are preferably interlocked by a locking mechanism such as locks 160. Preferably, cover 112 further includes a carrying handle 162, facilitating lifting granular-material-housing 110. Litter-container 114 operatively contains a variable amount of granular material 20 (see FIG. 3a) to allow for a variable number of animals to use the animal litter-box 100.

Granular-sifting-apparatus 120 includes a container body 122, having enclosed walls 121 and floor 123. Granular-sifting-apparatus 120 is configured to hold the variable amount of granular material 20 disposed inside litter-container 114, when sifting the granular material 20.

Reference is also made to FIG. 4a, a top perspective view illustration of paws-sifter 130 of the cat litter-box 100; and to FIG. 4b, a bottom perspective view illustration of paws-sifter 130. Paws-sifter 130 includes a plate 132, having a plurality of through holes 134 (see FIG. 2a) formed therein. The shape of through holes 134 is not limited to any shapes including polygons, circles, an ellipse, a rectangle and other shapes, and the arrangement is not limited to any arrangements including a mesh, a grid and other shapes. Furthermore, any size of holes 134 is acceptable as long as paws of an animal, such as a cat, do not drop through holes 134 when the animal walks thereon, while the granular material shed off the animal paws does drop through holes 134.

It should be noted that the present invention may be described in terms of the animal being a cat, but the present invention is not limited for use by cats and may be used by other types of animals.

Optionally, paws-sifter 130 further includes a mechanism to lift paws-sifter 130. In the example shown in FIGS. 1 and 3a-4b, the sifter lifting mechanism includes two pin-handles 138 disposed on the top surface of plate 132, facilitating gripping and lifting, as well as putting back in place, of paws-sifter 130.

Optionally, paws-sifter 130 further includes spacers 136 protruding downwards from plate 132, to allow placing paws-sifter 130 on any surface, without plate 132 actually touching it.

Figure 5:
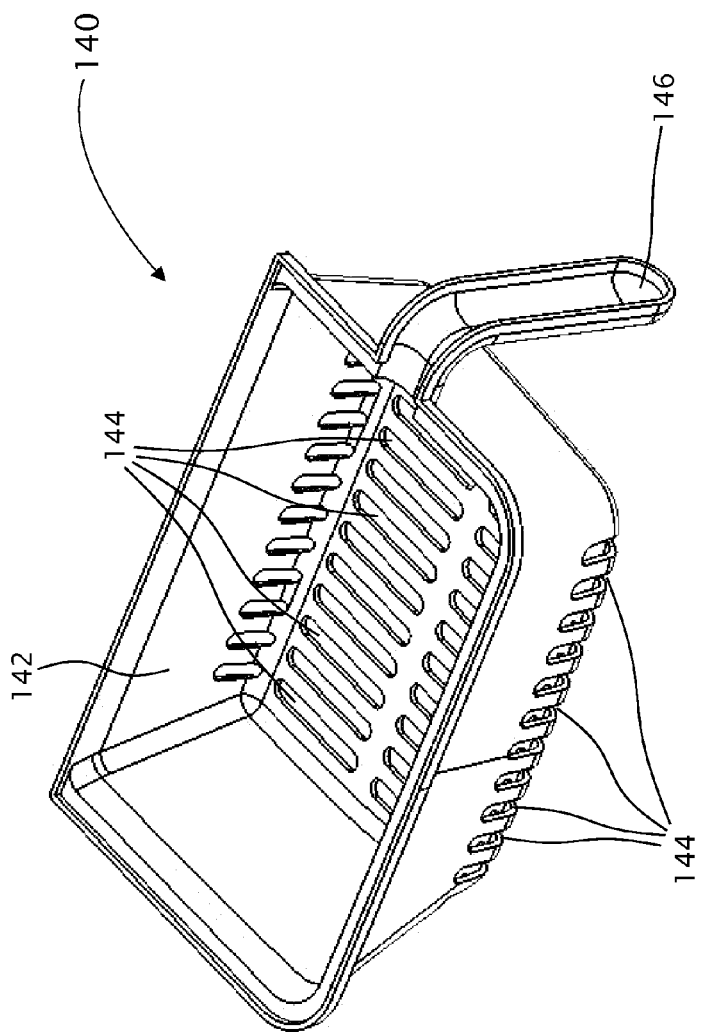
FIG. 5 is a top perspective view illustration of a litter-scooper of the animal litter-box shown in FIG. 1.

Reference is also made to FIG. 5, a top perspective view illustration of litter-scooper 140 of the animal litter-box 100. Litter-scooper 140 includes a scooper body 142, having at least partially perforated walls and floor, and an open top end 148. Litter-scooper 140 is configured to sift through a variable amount of granular material 20 disposed through scooper body 142, by letting sifted granular material 20 fall through sifting-openings 144, formed at the bottom, and optionally, at the lower sides, of scooper body 142. Sifting-openings 144 are preconfigured to allow sifted granular material 20 to freely fall through them, while catching the waste aggregates, formed as a result of the cat using the device. Thereby, the granular material 20, accumulated inside container body 122 is sifted granular material 20. Preferably, litter-scooper 140 further includes a handle 146, facilitating a user to lift (and place back) litter-scooper 140 from (onto) granular-sifting-apparatus 120.

It should be noted that when paws-sifter 130 in placed on top of granular-sifting-apparatus 120, paws-sifter 130 is disposed immediately above litter-scooper 140, onto upper-scooper-rim 148. Thereby, when the animal walks on paws-sifter 130, the granular material 20 shedding off the animal paws drops first through holes 134 into litter-scooper 140, and then falls further through sifting-openings 144 and into container body 122.

Figure 6:
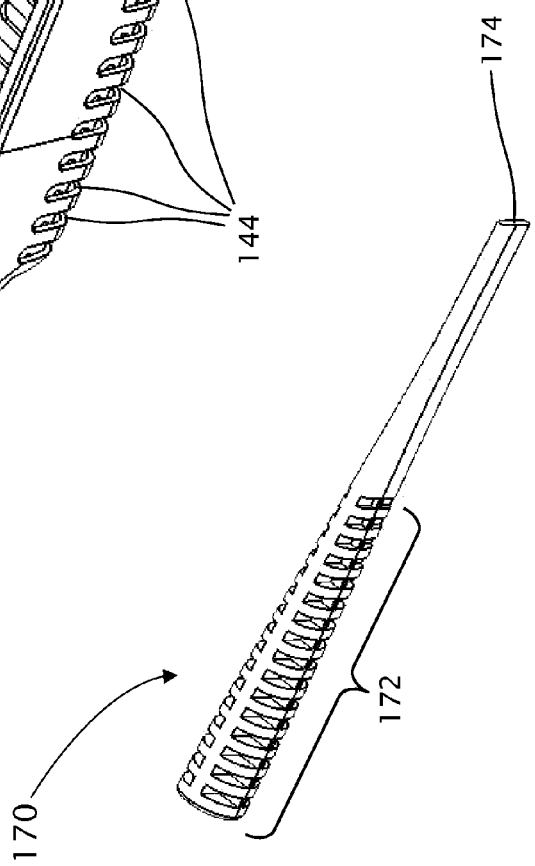
FIG. 6 is a top perspective view illustration of a scraper of the animal litter-box shown in FIG. 1, according to variations of the present invention.

Reference is also made to FIG. 6, a top perspective view illustration of a scraper 170 of the animal litter-box 100, according to variations of the present invention. In an event in which some of the cat waste aggregates are stuck to the bottom floor (or walls) of litter-container 114, scraper 170 can be used to detach the stuck waste aggregates from the inner surface of litter-container 114. In order to use scraper 170, handle 172 is employed to hold the scraper, while edge 174 is used to detach the stuck waste aggregates. In such an event, cover 112 may be unlocked and removed from the top of litter-container 114 to allow for easier access.

Figure 7:
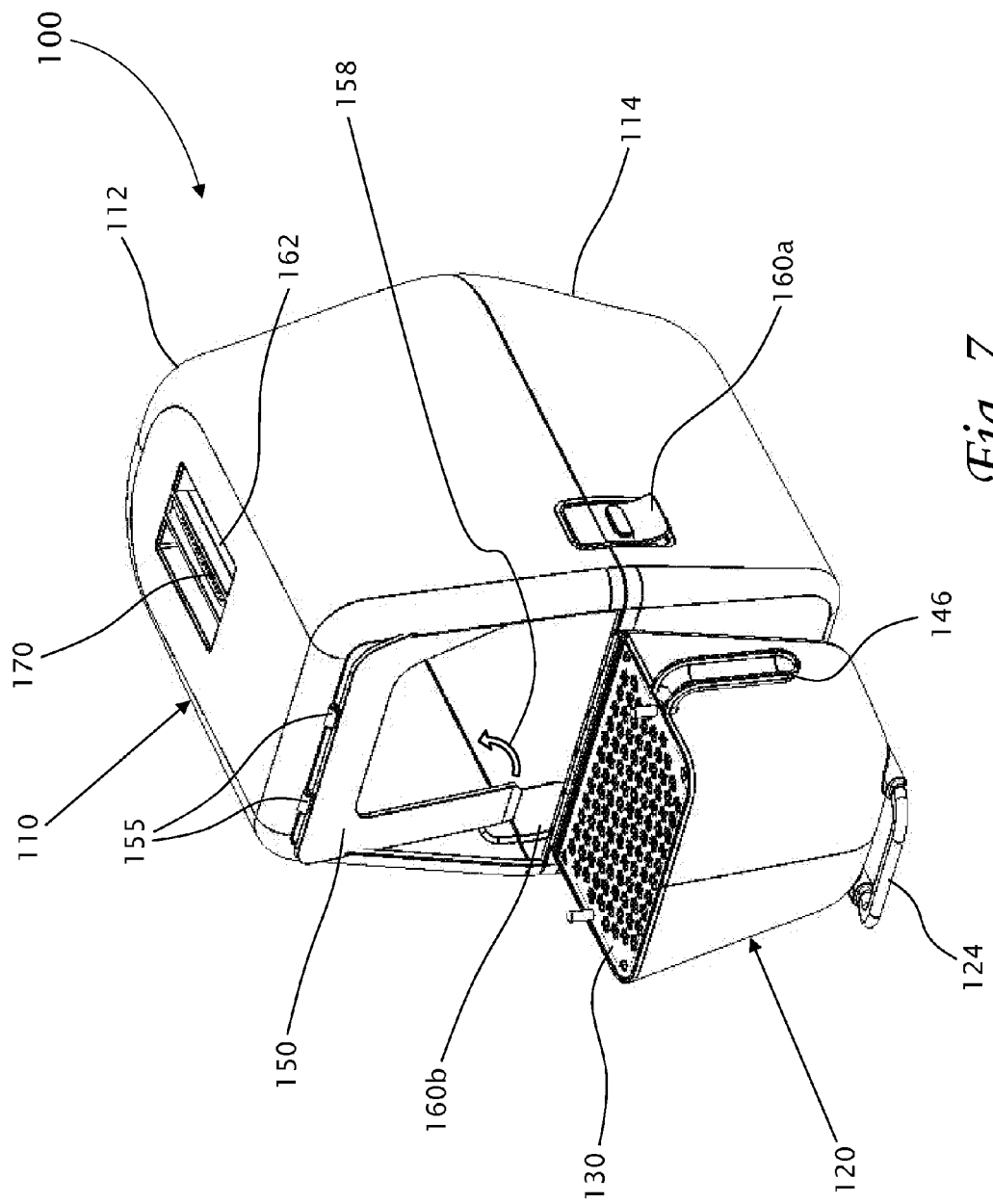
FIG. 7 is a perspective view illustration of the animal litter-box shown in FIG. 2, wherein the door is partially pivoted inwardly.

The body of cover 112 includes walls and an enclosing roof, wherein carrying handle 162 is disposed on the roof of cover 112. At least one side (typically the front) of the body of cover 112 is open and has a window opening 118 formed in the wall of that side. At the bottom edge of window opening 118, granular-sifting-apparatus 120 is pivotally attached to granular-material-housing 110. The pivotal motion is facilitated about axis 105 (see FIG. 3a). Typically, granular-sifting-apparatus 120 is substantially smaller and lower than granular-material-housing 110. At the top edge of window opening 118, pivoting-door 150 is pivotally attached thereto, wherein pivotal motion is facilitated about axis 155 (see FIGS. 2 and 3), inwardly. Preferably, a stopper mechanism prevents pivoting-door 150 from pivoting outwardly. Therefore, cats walking out of litter-box 100 are forced to walk on top of the perforated section of paws-sifter 130. FIG. 7 is a perspective view illustration of animal litter-box 100, wherein pivoting-door 150 is shown partially pivoted inwardly, in direction 158.

Figure 8A:
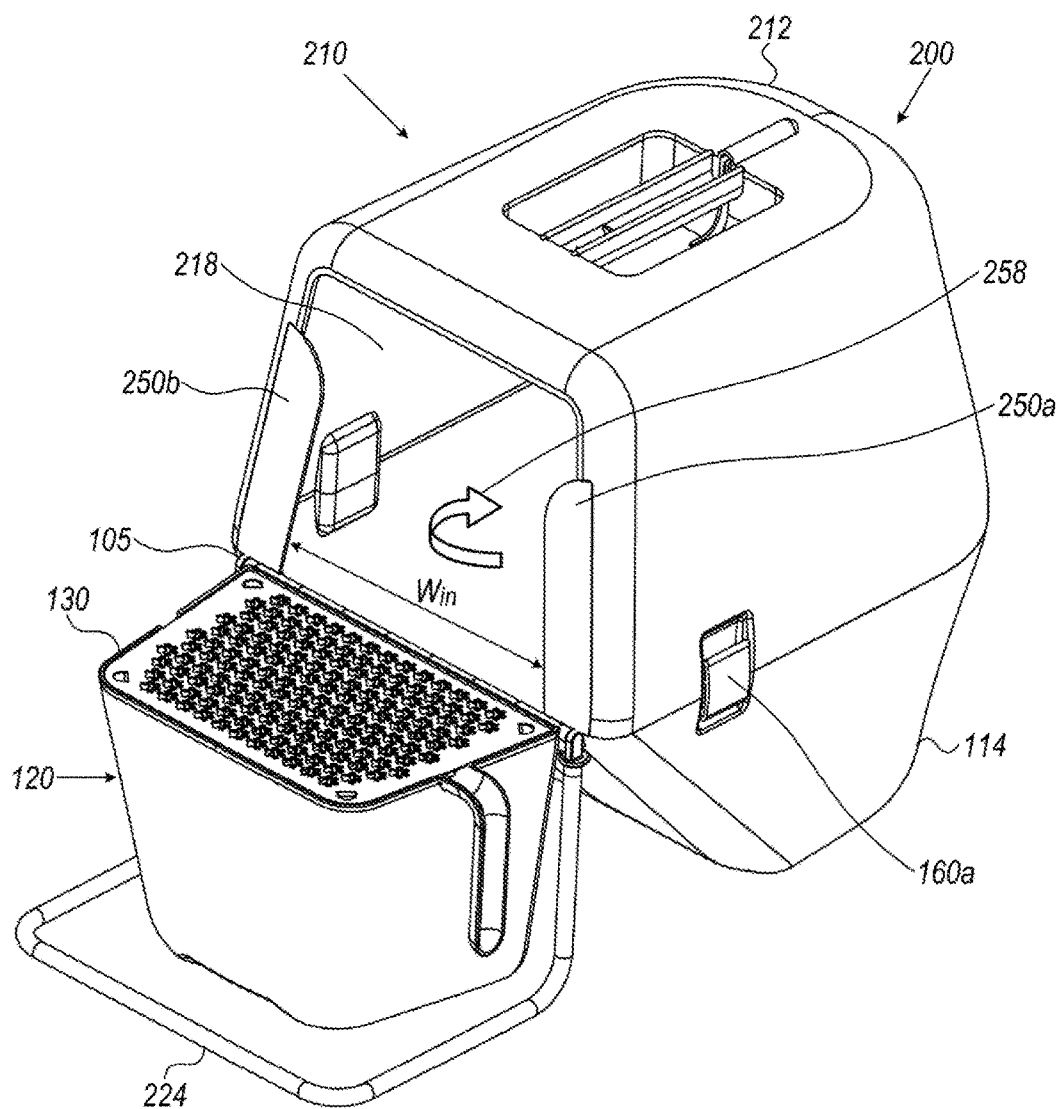
FIG. 8a is a top perspective view illustration of an animal litter-box, according to variations of the present invention, having optional flap doors.
Figure 8B:
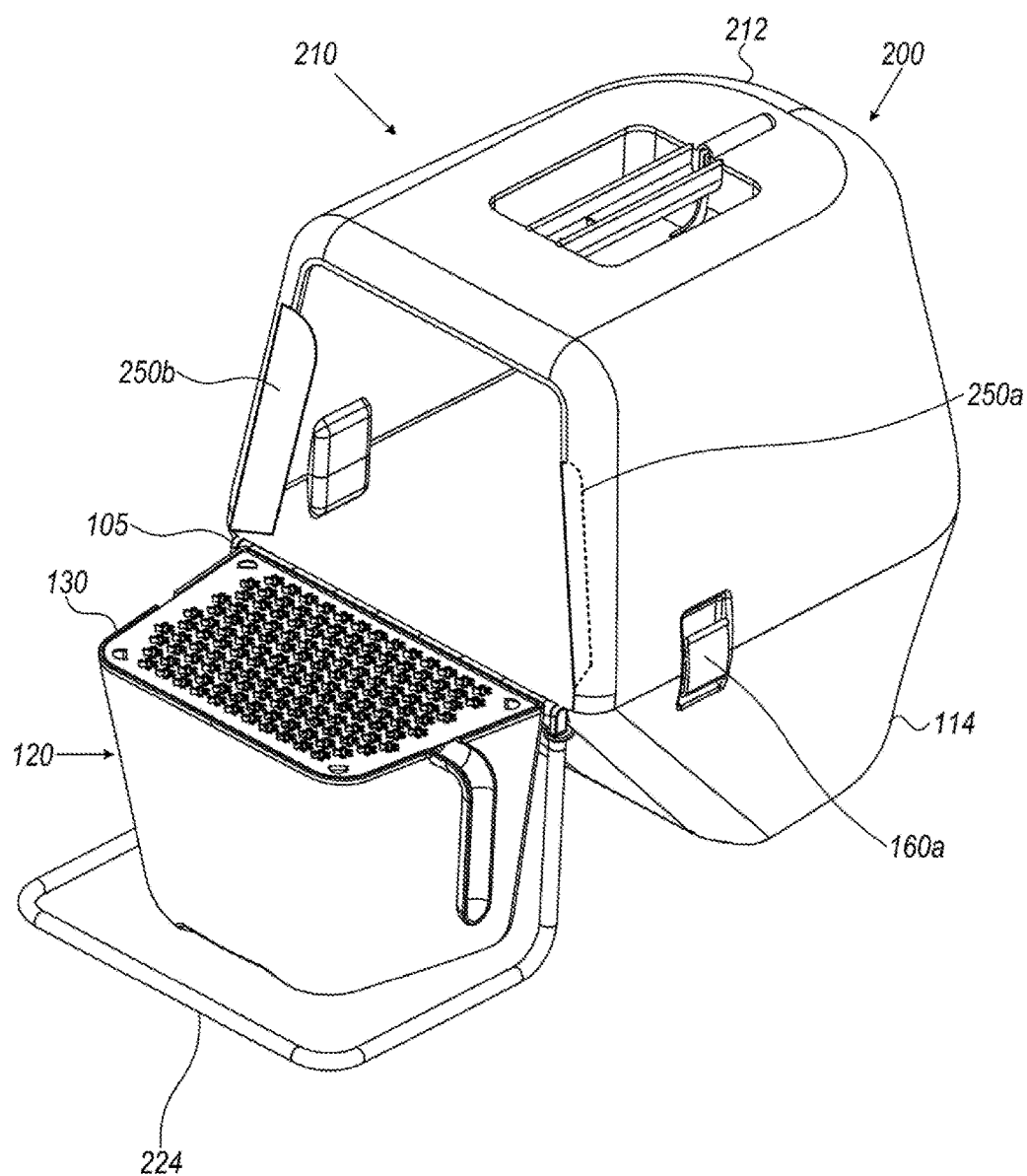
FIG. 8b is a top perspective view illustration of an animal litter-box shown in FIG. 8a, wherein the flap doors are pivoted inwardly.
Figure 8C:
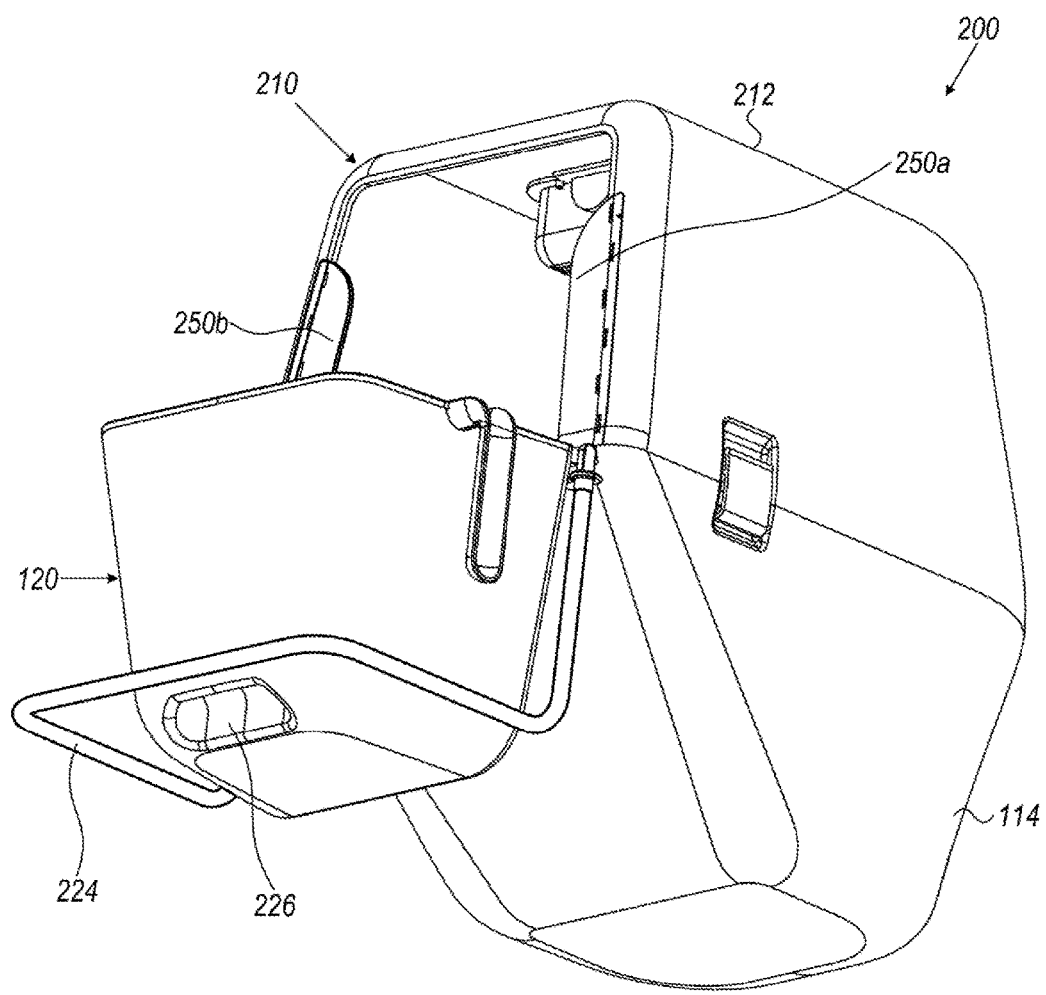

It should be noted that the present invention is not limited in using the pivoting-door (150), as shown in FIGS. 1, 2 and 7, and other types and forms of limiting doors may be used within the scope of the present invention. For example, FIG. 8a illustrates a top perspective view of an animal litter-box 200, according to variations of the present invention, having optional limiting-doors 250. FIG. 8c is a bottom perspective view illustration of animal litter-box 200.

In one embodiment, limiting-doors 250 are elastic doors that are securely connected at or proximal to the side edges of the window opening 118, as shown in FIG. 3b, forming a limited window opening 218, as shown in FIG. 8a. Elastic limiting-doors 250 are configured to bend when a force is applied generally perpendicular to the surface of elastic limiting-doors 250, and return to the flat form when such force is removed.

In another embodiment, limiting-doors 250 are flap doors, pivotally connected at or proximal to the side edges of the window opening 118, as shown in FIG. 3b, forming a limited window opening 218, as shown in FIG. 8a. FIG. 8b is a top perspective view illustration of animal litter-box 200, wherein flap-type limiting-doors 250 are shown pivoted inwardly, in direction 258. When flap-type limiting-doors 250 are not being pushed inwardly, a respective biasing force, such as a spring (not shown), flips limiting-doors 250 back to a closed state, as shown in FIG. 8a. The remaining open space, when limiting-doors 250 are in a closed state, is denoted by annotation number 218.

Figure 9:
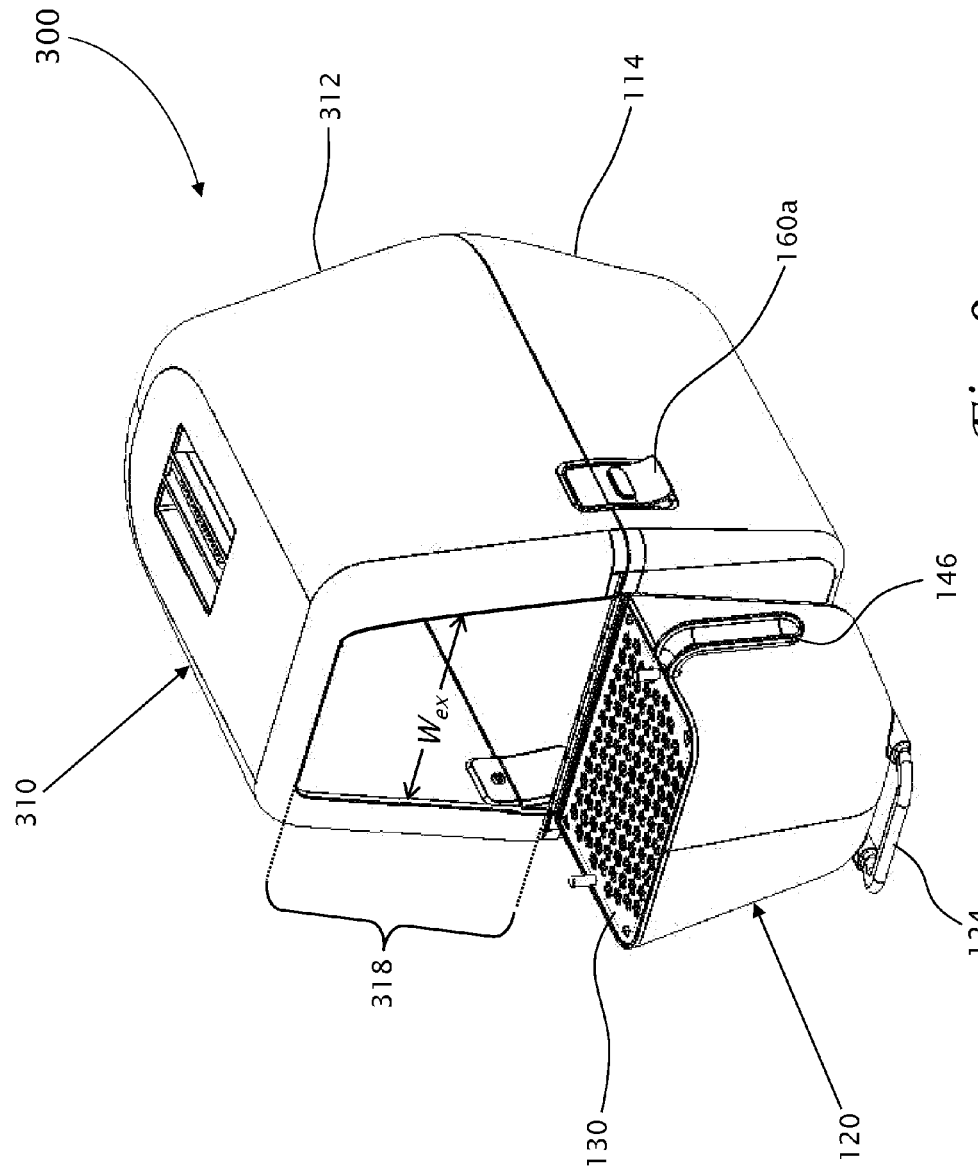
FIG. 9 is a top perspective view illustration of an animal litter-box having no inlet pivoting doors.

In other variations of the present invention, no pivoting door(s) is mounted on, or proximal to, one or more edges of window opening 118. FIG. 9 is a top perspective view illustration of an animal litter-box 300 having no inlet limiting doors.

Preferably, the external width of granular-sifting-apparatus 120 is slightly smaller than or equal to width $W_{ex}$ of granular-material-housing 310, to facilitate pivotal motion of granular-sifting-apparatus 120 through window opening 318 formed at the front side of cover 312 of granular-material-housing 310.

In an ordinary operational state of litter-box (100, 200, 300), both the granular-material-housing (110, 210, 310) and granular-sifting-apparatus 120 are disposed on a floor at a desired location. Cats are free to climb on top of paws-sifter 130, and then into the granular-material-housing (110, 210, 310), where they use granular material 20 as a toilet. When done, the cat is forced to walk on the paws-sifter 130, to thereby shed granular material 20 attached to its paws into container body 122.

Figure 10A:
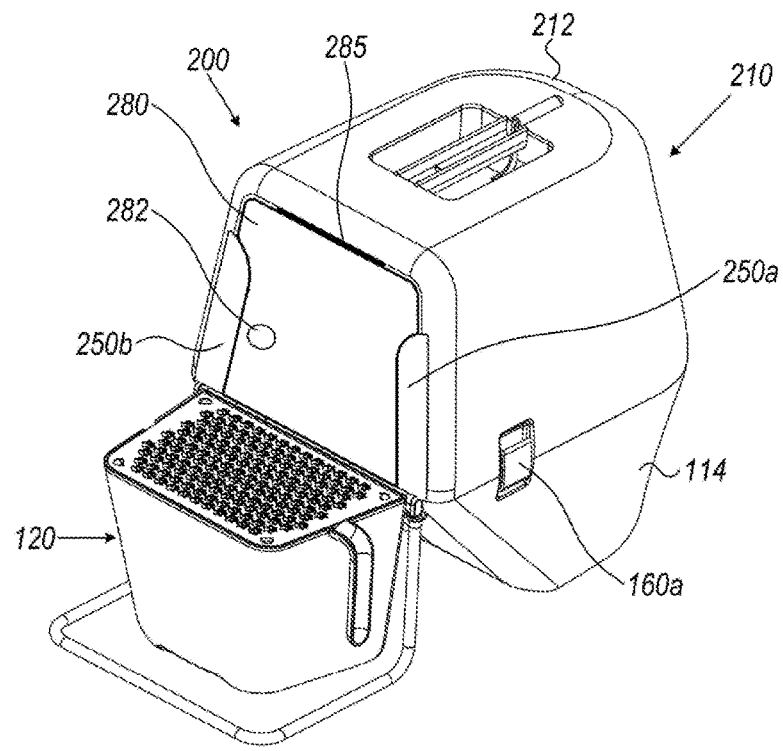
FIG. 10a is a perspective view illustration of the animal litter-box, shown in FIG. 8a, wherein the window opening is enclosed by an enclosing-door, according to variations of the present invention.
Figure 10B:
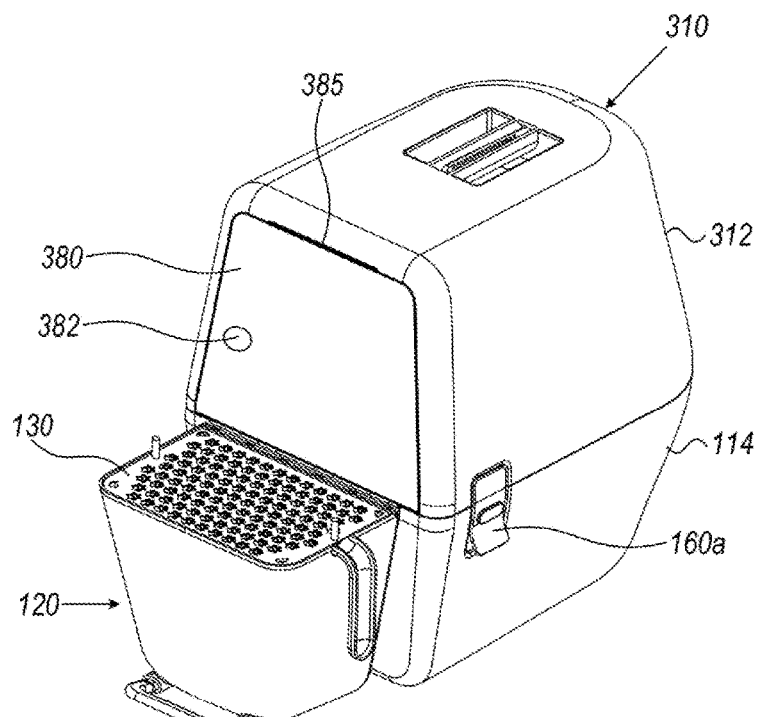
FIG. 10b is a perspective view illustration of the animal litter-box, shown in FIG. 9, wherein the window opening is enclosed by an enclosing-door, according to variations of the present invention.

Reference is now made to FIGS. 10a and 10b that are perspective view illustrations of animal litter-box 200 and 300, respectively, wherein the respective window opening (218, 318) is enclosed by a respective enclosing-door (280, 380), according to variations of the present invention. During routine operation of the litter-box (100, 200, 300), the enclosing-doors (280 or 380) prevent or substantially reduce odors being released from the litter-box (100, 200, 300). The enclosing-doors (280 or 380) include a handle (282 or 382) for use by a user in a cleaning operation (as described here below) and are pivotally connected by a hinge (285 or 385) to the top edge of the window opening (218, 318) or at the top section of said side edges of said window opening.

When a person (typically the owner of the cat) wants to clean the litter-box (100, 200, 300), the person first removes paws-sifter 130, as seen in FIG. 2, and as a result of that, the animal litter-box (100, 200, 300) changes from an "operational state" to a "cleaning state".

Reference is now made to FIG. 11a, a perspective view illustration of the animal litter-box (100, 200, 300), wherein the granular-material-housing (110, 210, 310) is partially pivoted towards the granular-sifting-apparatus 120. FIG. 11b is a side view illustration of the animal litter-box (100, 200, 300), as shown in FIG. 11a. In the example shown in FIGS. 11a and 11b, the user uses his/her foot 30 to step on foothold 124, while grabbing carrying handle 162, and simply pulls up the granular-material-housing (110, 210, 310) towards granular-sifting-apparatus 120 that is held in position by the user's foot 30. While granular-sifting-apparatus 120 remains in place, the granular-material-housing (110, 210, 310) pivots about axis 105 towards granular-sifting-apparatus 120. In one embodiment, foothold 124 may be securely attached to the bottom of container body 122 of granular-sifting-apparatus 120. In another embodiment, foothold 224 may be securely attached to the shaft of axis 105 (see FIGS. 8a and 8b), pivotally attaching granular-sifting-apparatus 120 to the granular-material-housing (110, 210, 310). It should be noted that the present invention is not limited in using foothold 124 or foothold 224 to stabilize granular-sifting-apparatus 120, while pouring the granular material 20, including waste aggregates, from litter-container 114 into litter-scooper 140 and through litter-scooper 140 into granular-sifting-apparatus 120. Foothold 124 and foothold 224 are non-limiting examples for devices aimed to stabilize granular-sifting-apparatus, and other stabilizing devices and methods may be used to stabilize granular-sifting-apparatus 120, while pouring the granular material 20, including waste aggregates, from litter-container 114 into granular-sifting-apparatus 120.

Figure 12:
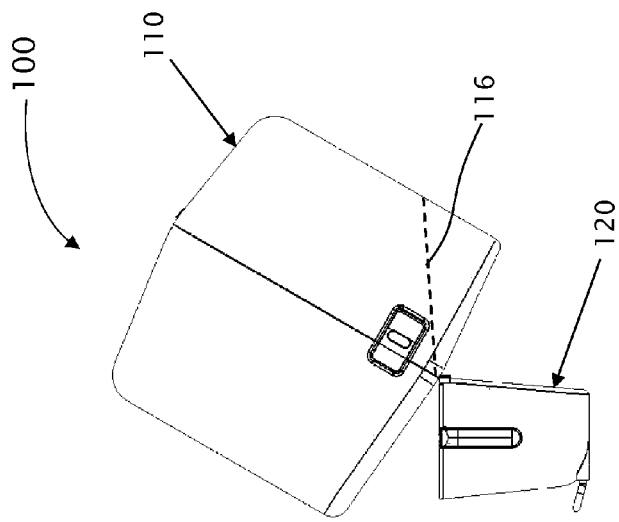
FIG. 12 is a perspective view illustration of the animal litter-box shown in FIG. 2, wherein the granular-material-housing is further pivoted towards the granular-sifting-apparatus, with respect to the state shown in FIG. 11b.
Figure 13:
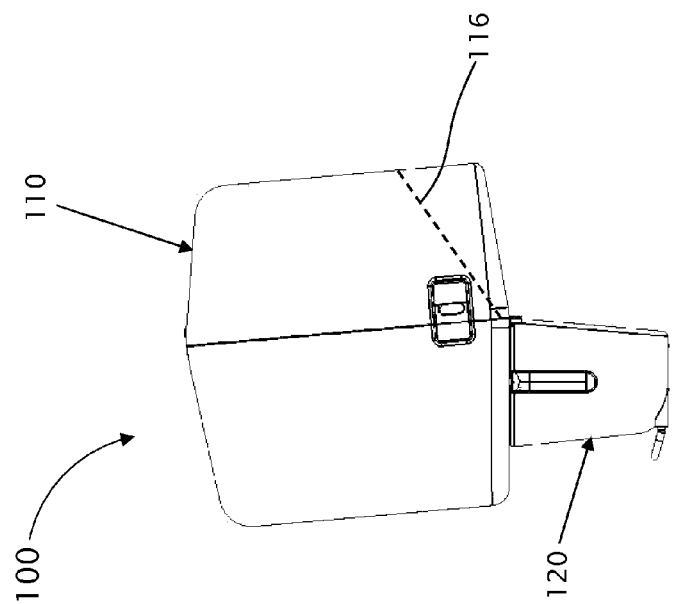
FIG. 13 is a perspective view illustration of the animal litter-box shown in FIG. 2, wherein the granular-material-housing is further pivoted towards the granular-sifting-apparatus, with respect to the state shown in FIG. 12.
Figure 14:
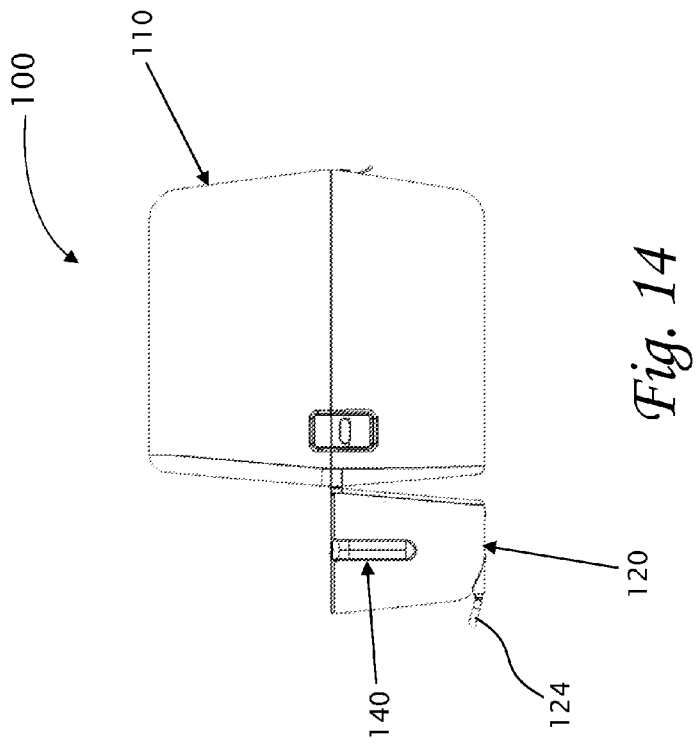
FIG. 14 is a side view illustration of the animal litter-box shown in FIG. 2, wherein the granular-material-housing has been placed back onto the floor.

Referring also to FIG. 12, a perspective view illustration of the animal litter-box (100, 200, 300), wherein the granular-material-housing (110, 210, 310) is further pivoted towards granular-sifting-apparatus 120, with respect to the state shown in FIG. 11b. Referring also to FIG. 13, a perspective view illustration of the animal litter-box (100, 200, 300), wherein the granular-material-housing (110, 210, 310) is further pivoted towards granular-sifting-apparatus 120, with respect to the state shown in FIG. 12. As the user keeps pivoting the granular-material-housing (110, 210, 310) towards granular-sifting-apparatus 120, typically up to the position shown in FIG. 13, the granular material 20, including waste aggregates, start pouring out of litter-container 114 and into and through litter-scooper 140. Litter-scooper 140 sifts the granular material 20 waste aggregates allowing the sifted granular material 20 to fall through sifting-openings 144. The sifted granular material 20 accumulates inside container body 122 while the waste aggregates remain inside litter-scooper 140. After returning the granular-material-housing (110, 210, 310) to the original position, as shown in FIG. 14, the user can comfortably dispose of the collected waste using litter-scooper 140.

It should be noted that since pivoting-door 150 cannot pivot outwardly beyond the inner space of granular-material-housing 110 and since the external width of granular-sifting-apparatus 120 is larger than to the width $W_{in}$ of the opening formed inside pivoting-door 150, the granular material 20 and waste aggregates, pouring out of litter-container 114, are better directed into litter-scooper 140, minimizing spillage out of the sides of the animal litter-box (100, 200).

Preferably, litter-container 114 further includes a sloped-inner-wall 116 that facilitates faster departure of the granular material 20 and waste aggregates out of litter-container 114, while serving as a convenient ramp to allow the cat easy access to the granular material contained inside litter-container 114. Sloped-inner-wall 116 commences at axis 105 and ends at a preconfigured location of the inner floor of litter-container 114. Optionally, sloped-inner-wall 116 is also the external wall of litter-container 114 that is proximal to granular-sifting-apparatus 120.

Figure 15:
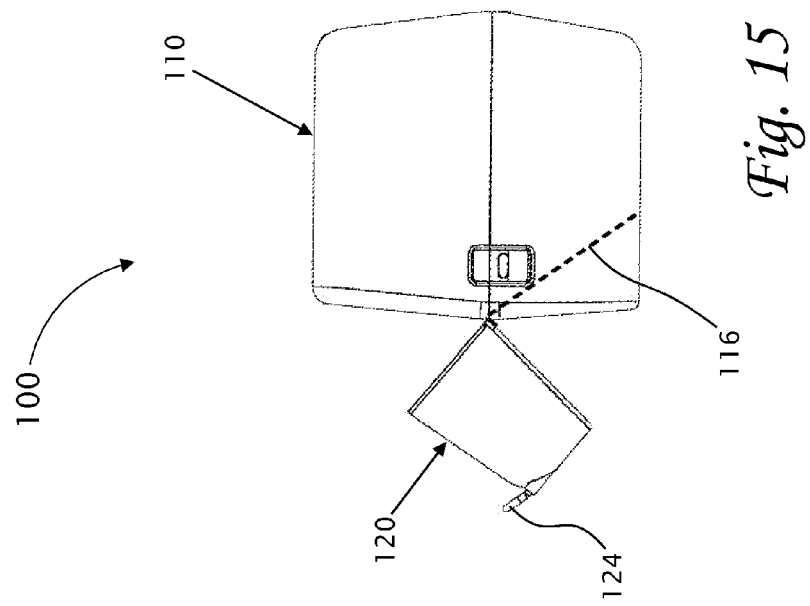
FIG. 15 is a perspective view illustration of the animal litter-box shown in FIG. 14, wherein the granular-sifting-apparatus is partially pivoted towards the granular material housing.
Figure 16:
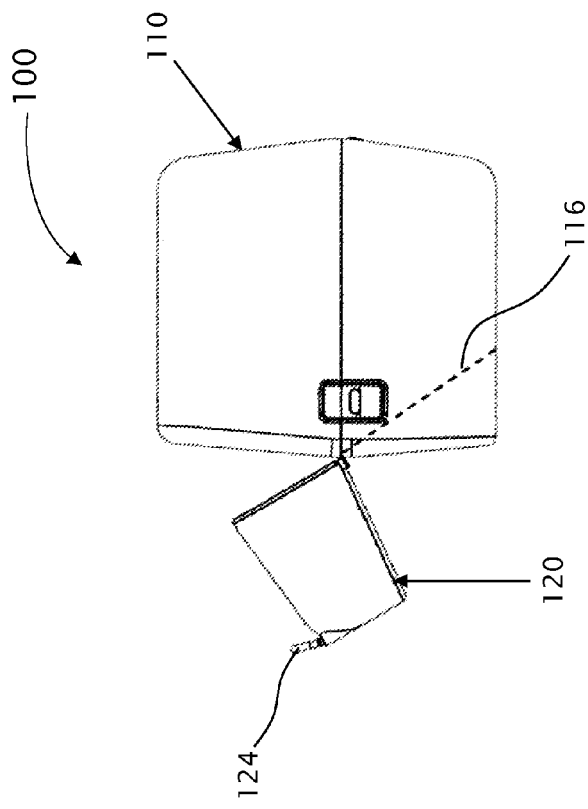
FIG. 16 is a perspective view illustration of the animal litter-box shown in FIG. 14, wherein the granular-sifting-apparatus is further pivoted towards the granular material housing, with respect to the state shown in FIG. 15.
Figure 17:
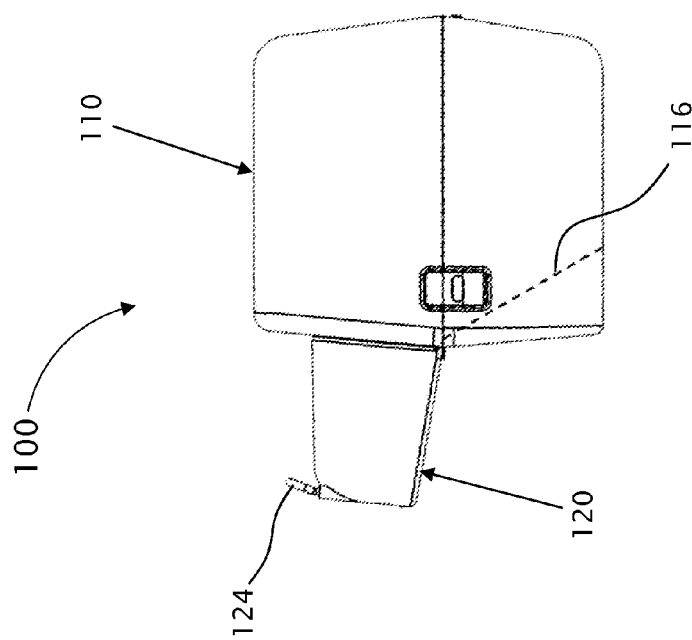
FIG. 17 is a perspective view illustration of the animal litter-box shown in FIG. 14, wherein the granular-sifting-apparatus is further pivoted towards the granular material housing, with respect to the state shown in FIG. 16.

To return to an "operational state", the user pivots granular-sifting-apparatus 120 towards the granular material housing (110, 210, 310), as illustrated in FIG. 15. Reference is also made to FIG. 16, a perspective view illustration of the animal litter-box (100, 200, 300), wherein granular-sifting-apparatus 120 is further pivoted towards the granular material housing (110, 210, 310), with respect to the state shown in FIG. 15; to FIG. 17, a perspective view illustration of the animal litter-box (100, 200, 300), wherein granular-sifting-apparatus 120 is further pivoted towards the granular material housing (110, 210, 310), with respect to the state shown in FIG. 16; to FIG. 18, a perspective view illustration of the animal litter-box (100, 200, 300), wherein granular-sifting-apparatus 120 is further pivoted towards the granular material housing (110, 210, 310), with respect to the state shown in FIG. 17; and to FIG. 19, a perspective view illustration of the animal litter-box (100, 200, 300), wherein granular-sifting-apparatus 120 is further pivoted towards the granular material housing (110, 210, 310), with respect to the state shown in FIG. 18.

As the user keeps pivoting granular-sifting-apparatus 120 towards the granular-material-housing (110, 210, 310), the sifted granular material 20, accumulated inside container body 122, start pouring out of container body 122 and into litter-container 114. This process is complete when all of the sifted granular material 20 returns to litter-container 114.

Figure 18:
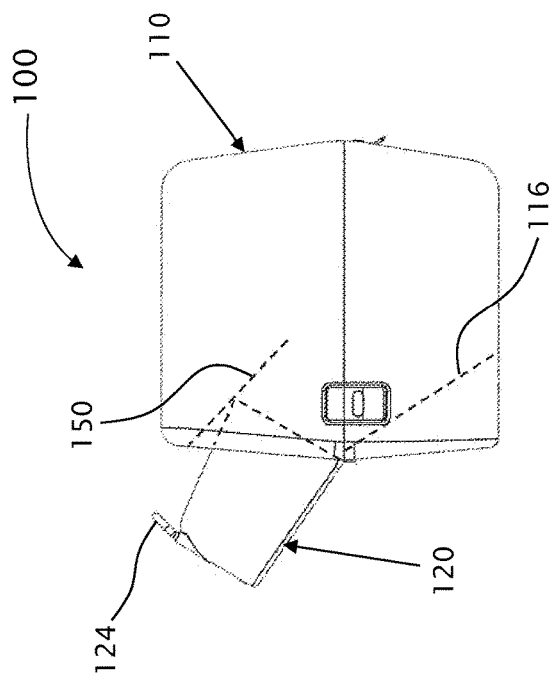
FIG. 18 is a perspective view illustration of the animal litter-box shown in FIG. 14, wherein the granular-sifting-apparatus is further pivoted towards the granular material housing, with respect to the state shown in FIG. 17.
Figure 19:
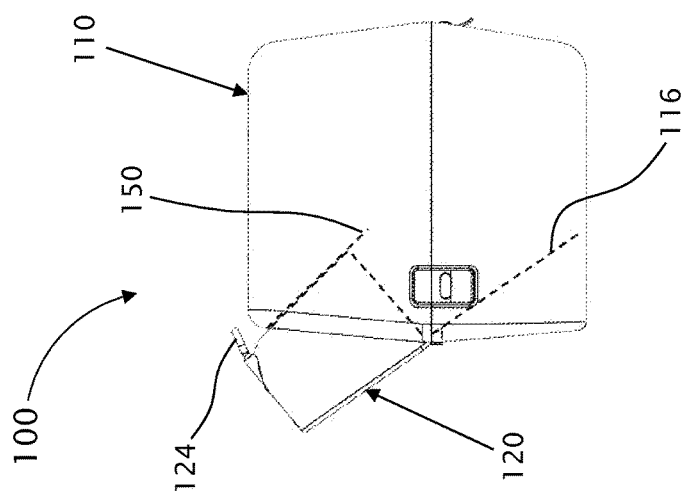
FIG. 19 is a perspective view illustration of the animal litter-box shown in FIG. 14, wherein the granular-sifting-apparatus is further pivoted towards the granular material housing, with respect to the state shown in FIG. 18.

It should be noted that since pivoting-door 150 is being pivotally pushed inwardly into the inner space of the granular-material-housing (110, 210, 310), the sifted granular material 20, pouring out of granular-sifting-apparatus 120, is better directed into granular-material-housing (110, 210, 310), minimizing spillage out of the sides of the animal litter-box (100, 200, 300), as the width of granular-sifting-apparatus 120 is smaller than the width $W_{ex}$ (see FIG. 3b) of window openings 118 and 318. This situation is illustrated in FIGS. 18 and 19.

When done transferring the granular material 20 into litter-container 114, the user pivots granular-sifting-apparatus 120 back to the ground. Then, the user places litter-scooper 140 back on top of container body 122. Finally, as the user places paws-sifter 130 back on top of litter-scooper 140, the litter-box (100, 200, 300) returns back to an "operational state".

It should be noted that in variations of the present invention, paws-sifter 130 is replaced by a non-perforated plate.

Optionally, the litter-box (100, 200, 300) further includes activated carbon filters (not shown) to prevent or reduce litter odor. The activated carbon filters may be disposed inside a designated compartment inside the bay of carrying handle 162, or elsewhere within granular-material-housing 110.

The invention being thus described in terms of embodiments and examples, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An animal litter-box (100, 200, 300) comprising:
   a) a granular-material-housing (110, 210, 310) having a window opening (118, 218, 318) formed in a front side (111) of said granular-material-housing, allowing an animal to walk in and out of said granular-material-housing, said window opening having two side edges and a top edge and a width ($W_{ex}$) measured between said side edges;
   b) a limiting-door (150, 250), wherein a limited window opening is formed between side portions of said limiting-door, said limited window opening having a width ($W_{in}$); and
   c) a granular-sifting-apparatus (120) having a width and comprising:
      i. a container body (122) having a bottom;
      ii. a litter-scooper (140) disposed inside an upper portion of said container body and comprising a scooper body (142) having a bottom, wherein sifting-openings (144) are formed at said bottom of said scooper body and optionally, at lower sides of said scooper body; and
      iii. a paws-sifter (130), disposed on top (148) of said litter-scooper, for the animal to step on when going in and out of said granular-material-housing,
   wherein said window opening includes an upper edge, a lower edge and two side edges;
   wherein said granular-material-housing contains granular material up to a preconfigured level and, upon usage by the animal, possibly waste aggregates;
   wherein said limiting-door narrows said width ($W_{ex}$) of said window opening of said granular-material-housing to be less than or equal to said width of said granular-sifting-apparatus; and wherein said limiting-door is operable to move inwardly only with respect to said granular-material-housing;
   wherein said width ($W_{ex}$) of said window opening of said granular-material-housing is larger than said width of said granular-sifting-apparatus; and
   wherein said granular-sifting-apparatus is pivotally connected to said front side of said granular-material-housing, allowing transfer of granular material from said granular-material-housing to said granular-sifting-apparatus and from said granular-sifting-apparatus to said granular-material-housing.

2. The animal litter-box according to claim 1, wherein said transfer of granular material from said granular-material-housing to said granular-sifting-apparatus and from said granular-sifting-apparatus to said granular-material-housing is performed with minimal spillage of granular material out of the sides of the animal litter-box.

3. The animal litter-box according to claim 1, wherein said granular-sifting-apparatus is pivotally connected about a pivoting axis (105) to said front side of said granular-material-housing, at the lower edge of the window opening.

4. The animal litter-box according to claim 1, wherein a stopper mechanism prevents limiting-door from pivoting outwardly with respect to said granular-material-housing.

5. The animal litter-box according to claim 1, where said limiting-door (150) is pivotally connected to said top edge of said window opening (118) or at respective top section of said side edges of said window opening.

6. The animal litter-box according to claim 1, wherein said granular-material-housing comprises a bottom part (114) and a top part (112), said bottom part being a litter-container and said top part being a cover.

7. The animal litter-box according to claim 6, wherein said litter-container comprises a sloped-inner-wall (116) extending from, or proximal to, said pivoting axis, to a preconfigured location at an inner floor of said litter-container.

8. The animal litter-box according to claim 7, wherein said sloped-inner-wall is an external wall of said litter-container.

9. The animal litter-box according to claim 6, wherein said cover comprises a carrying handle (162).

10. The animal litter-box according to claim 1 further comprises a foothold for holding said granular-sifting-apparatus in position.

11. The animal litter-box according to claim 10, wherein said foothold (124) is securely attached to said bottom of said granular-sifting-apparatus.

12. The animal litter-box according to claim 10, wherein an external recess is formed at, or proximal to, said bottom of said container body, facilitating pivotal lifting of said container body.

13. The animal litter-box according to claim 1, wherein said sifting-openings are larger than the granular material and smaller than those of typical waste aggregates.

14. The animal litter-box according to claim 1, wherein said paws-sifter includes a plate (132) having a plurality of through-openings (134) formed therein, wherein said through-openings are larger than the granular material and smaller than those of typical animal paw size.

15. The animal litter-box according to claim 1 further comprising a scraper (170).

* * * * *